L. F. SCHANCK.
Potato Digger.

No. 53,349.

Patented Mar. 20, 1866.

Witnesses:

Inventor:

UNITED STATES PATENT OFFICE.

L. F. SCHANCK, OF HOLMDEL, NEW JERSEY.

IMPROVEMENT IN POTATO-DIGGERS.

Specification forming part of Letters Patent No. 53,349, dated March 20, 1866.

*To all whom it may concern:*

Be it known that I, L. F. SCHANCK, of Holmdel, Monmouth county, State of New Jersey, have invented a new and Improved Potato-Digger; and I do hereby declare that the following is a full, clear, and exact description thereof, which will enable others skilled in the art to make and use the same, reference being had to the accompanying drawings, forming part of this specification, in which—

Figure 1:
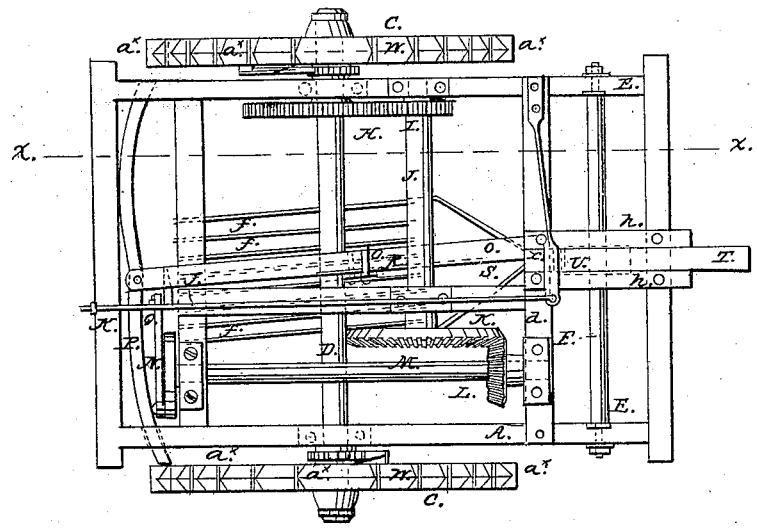
Figure 2:
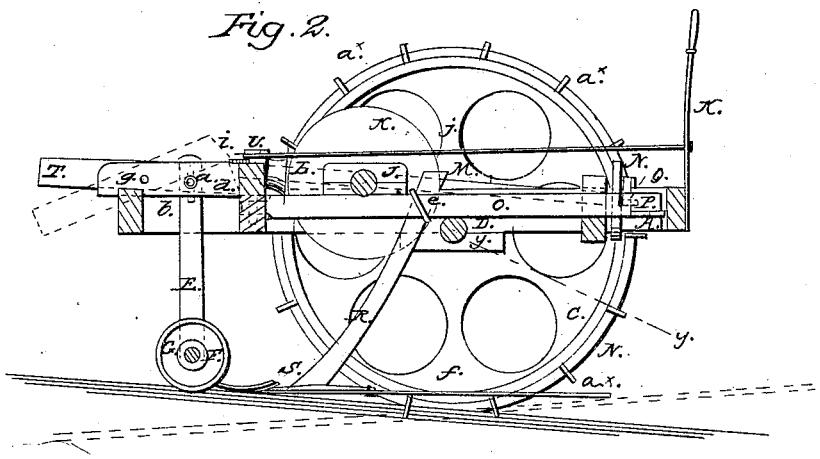
Figure 3:
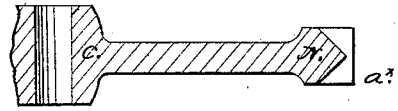

Figure 1 is a plan or top view of my invention; Fig. 2, a side sectional view of the same, taken in the line $x\ x$, Fig. 1; Fig. 3, a section of a portion of one of the wheels of the same, taken in the line $y\ y$, Fig. 2.

Similar letters of reference indicate like parts.

This invention relates to a new and improved machine for digging potatoes; and it consists in a share and screen arranged and operated so as to have a lateral vibratory motion, and be capable of being raised and lowered with the greatest facility, so that the share may be made to penetrate the earth and perform its work, or have its point raised up free from the earth, at the will of the operator.

The invention also consists in a novel construction of the wheels, whereby the earth is prevented from adhering to their peripheries, and sufficient traction always obtained to drive or oscillate the screen.

The invention also consists in a novel application of a roller to the machine, arranged in relation with the share so that the depths of the penetration of the latter may be graduated as desired.

A represents a rectangular frame, which is mounted on two wheels, C C, the wheels being placed loosely on their axle D, but connected to it by ratchets and pawls, so as to cause the wheels to rotate the axle when the machine is drawn forward, but not when the machine is backed.

To the front part of the frame A there are attached pendants E E, one at each side, and between the lower ends of these pendants a shaft, F, is fitted and allowed to turn freely, said shaft having a roller, G, keyed upon it at about its center. The pendants E are attached to the frame A by means of screws $a$, passing through oblong slots $b$ in the pendants, by which the pendants, and consequently the roller, may be adjusted higher or lower, as desired.

On the axle D there is keyed a spur-wheel, H, which gears into a pinion, I, on one end of a shaft, J, and on the opposite end of said shaft there is a bevel-wheel, K, which gears into a bevel-pinion, L, on the front end of a shaft, M, placed longitudinally in the frame A, and having a crank-pulley, N, at its rear end.

O is a bar, the front end of which is secured by a pivot, $e$, to a cross-bar, $d$, in the frame A, said bar having a longitudinal position on the frame and a guide-bar, P, attached to its rear end, said bar working through slots in the sides of the frame A. The rear end of the bar O is connected by a rod, Q, with the crank-pulley N.

R is a standard attached to the bar O by a clip, $e$, or other suitable means, and to the lower end of the standard R a share, S, is attached. This share may be constructed of a steel plate pointed at its front end, or made in V form, and having a series of parallel rods, $f$, attached to its rear end to form a screen, as shown in Fig. 1.

T represents the draft-pole, which is secured by a bolt, $g$, between hounds $h\ h$, on the front part of the frame A. The rear end of the draft-pole is beveled, as shown at $i$ in Fig. 2. U is a spring-catch secured upon the frame A, near its front end, and connected at its free or disengaged end by a rod, $j$, with a spring-lever, $k$, at the rear end of frame A.

The operation is as follows: As the machine is drawn along the share S is made to penetrate the hills or drills underneath the potatoes, the standard R dividing the hills or drills, and the potatoes and dirt are separated by the screen, which has a lateral motion communicated to it by the gearing, crank-pulley, and connecting-rod previously described. The dirt is removed from the potatoes by the riddling or screening operation, and the potoes left upon the top of the earth. The depth of the penetration of the share may be regulated, as described, by adjusting the roller G higher or lower.

The share S is slightly in advance of the axle, and hence it will be seen that by tilting down the rear of the frame A the share may be raised up out of the ground, and when the frame A is thus tilted it will be held by the spring-catch U, which catches over the rear end of the draft-pole T, the beveled rear end $i$ of the latter forcing back the catch, and the share may be let down to its work at any time by drawing back the spring-catch U, while the roller G keeps the share in a proper relative position with the earth, however uneven the latter may be.

The device is extremely simple and efficient, and may be constructed at a moderate cost.

The rims or peripheries W of the wheels C C are formed with a double bevel or in V form, as shown in Fig. 3, and plates $a^x$ are fitted radially in the peripheries of the wheels to prevent the latter from slipping. The beveled rims of the wheels effectually prevent dirt from adhering to them.

Having thus described my invention, I claim as new and desire to secure by Letters Patent—

1. The share and screen attached by a standard, R, to a bar Q, operated from the axle D, substantially as shown and described, to give a lateral vibratory motion to the share and screen, as set forth.

2. The adjustable roller G, in combination with the share and screen, and arranged relatively therewith, to operate as set forth.

3. The placing of the share S in front of the axle D to admit of the vertical adjustment of the share, substantially as described.

4. The spring-catch U, applied to the frame A, in combination with the beveled rear end, $i$, of the draft-pole, substantially as and for the purpose specified.

The above specification of my invention signed by me this 14th day of December, 1865.

L. F. SCHANCK.

Witnesses:
M. M. LIVINGSTON,
ALEX. F. ROBERTS.